Nov. 17, 1942.　　W. P. YARNALL　　2,302,283
VEHICLE PARKING SIGNAL
Filed July 19, 1940　　3 Sheets-Sheet 1
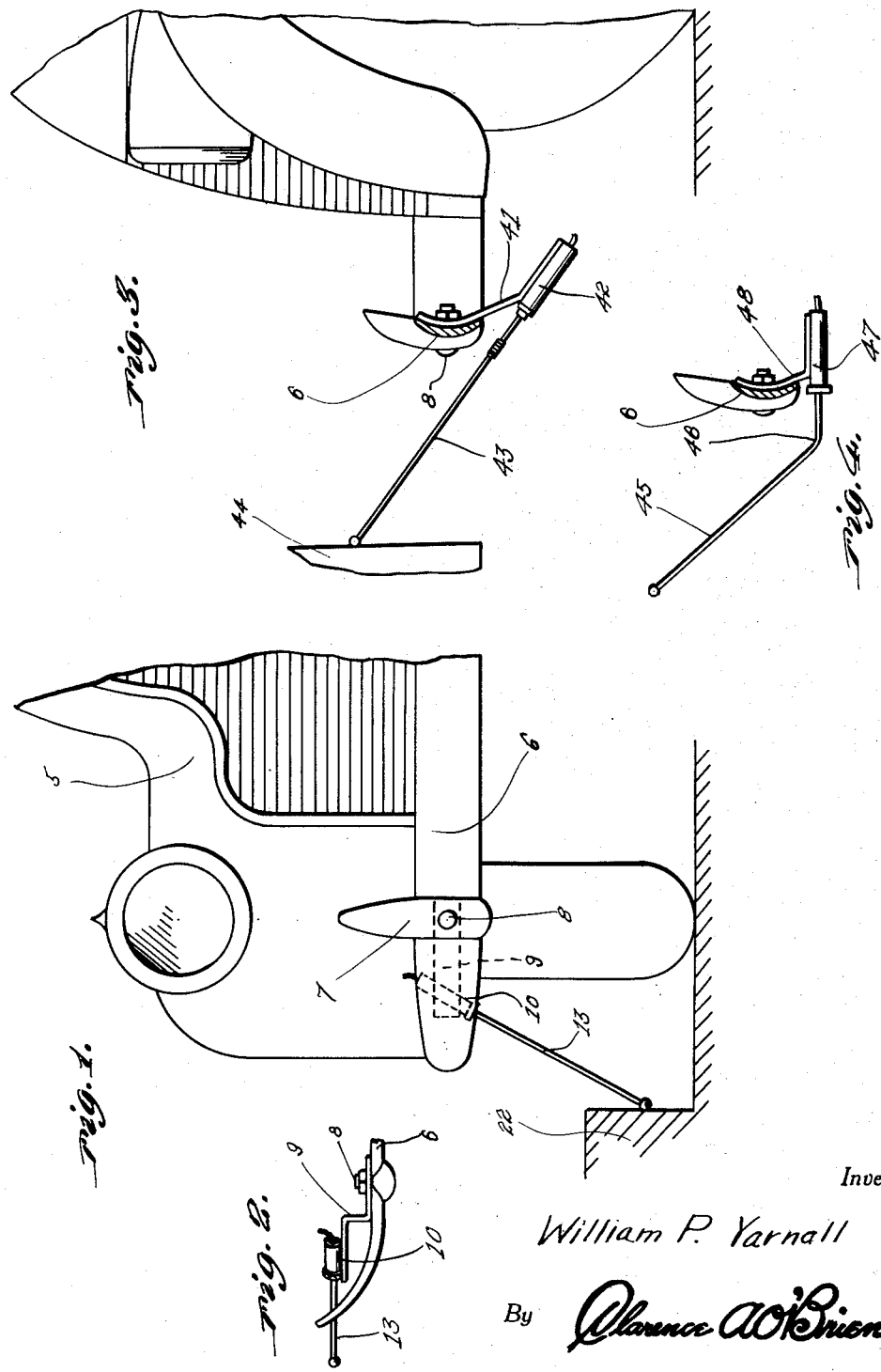
Inventor
William P. Yarnall
By Clarence A. O'Brien
Attorney Nov. 17, 1942.                    W. P. YARNALL                    2,302,283
                               VEHICLE PARKING SIGNAL
                              Filed July 19, 1940            3 Sheets-Sheet 2
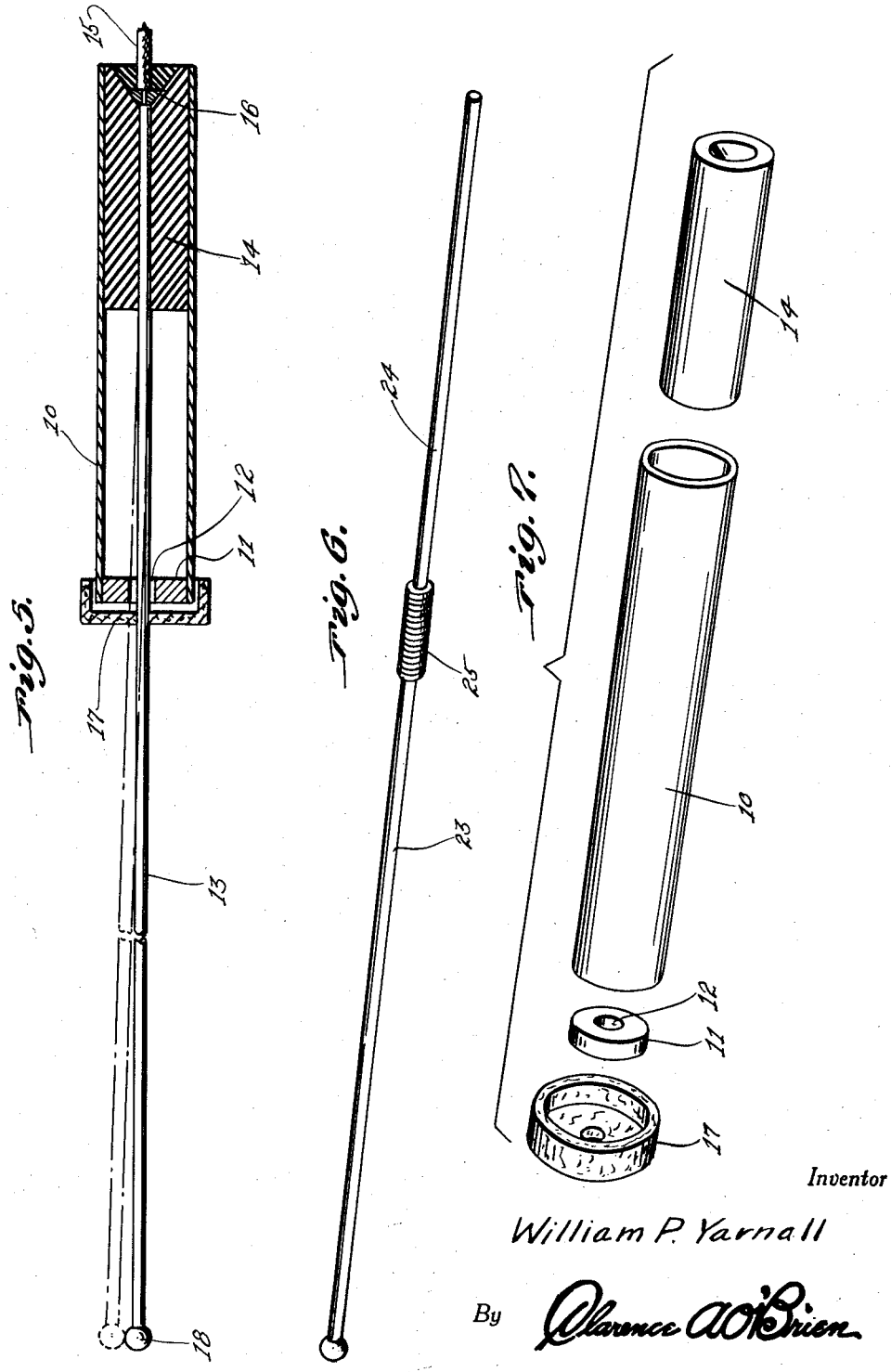
Inventor
William P. Yarnall
By  Clarence A. O'Brien
Attorney Nov. 17, 1942.   W. P. YARNALL   2,302,283
VEHICLE PARKING SIGNAL
Filed July 19, 1940   3 Sheets-Sheet 3
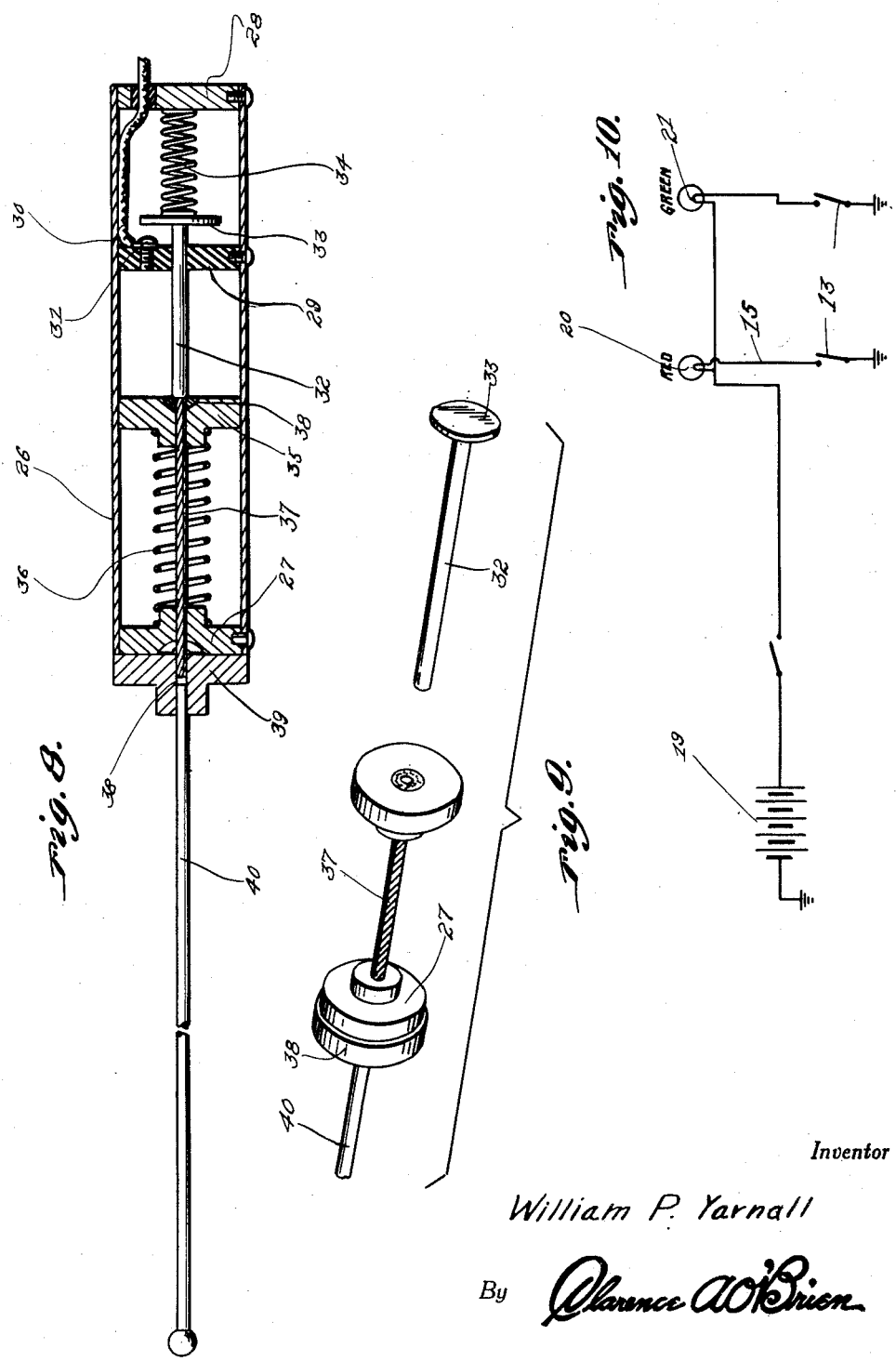
Inventor
William P. Yarnall
By *Clarence A. O'Brien*
Attorney Patented Nov. 17, 1942

2,302,283

UNITED STATES PATENT OFFICE 2,302,283

VEHICLE PARKING SIGNAL

William P. Yarnall, Cumberland, Md.

Application July 19, 1940, Serial No. 346,447

4 Claims. (Cl. 200—52)

The present invention relates to new and useful improvements in signalling devices for motor driven vehicles such as automobiles and the like and has for its primary object to provide signalling means to indicate when the vehicle is being driven into position in close relation to an obstruction, such as a curbstone, or an adjacent vehicle.

An important object of the present invention is to provide a signalling device of this character embodying a feeler arm attachable to a part of the vehicle and adapted, upon engagement with an object, to close an electric circuit whereby to warn the driver of the close approach of the vehicle to such obstruction.

A still further object of the present invention is to provide a novel feeler construction having an electric contact or switch carried thereby for closing the electric circuit upon a predetermined movement of the free end of the feeler.

A still further object is to provide a device of this character of simple and practical construction, which is efficient and reliable in performance, neat and attractive in appearance, relatively inexpensive to manufacture and install in operative position on the vehicle and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1 is a fragmentary front elevational view of a vehicle showing one form of the feeler in position thereon, Figure 2 is a top plan view, Figure 3 is a fragmentary side elevational view of the front end of an automobile showing the feeler mounted in position and projecting forwardly of the bumper, Figure 4 is a side elevational view of a modified form of feeler arm, Figure 5 is a longitudinal sectional view through one form of the switch for the feeler arm.

Figure 6 is a perspective view of one form of feeler arm having a spring interposed therein, Figure 7 is a group perspective view of the housing for the feeler arm, Figure 8 is a longitudinal sectional view of a modified form of switch, Figure 9 is a group perspective view of the switch contacts disclosed in Figure 8, and Figure 10 is a diagram of the electric circuit, for the signalling devices.

Referring now to the drawings in detail, and with particular reference to Figures 1 and 2 of the drawings, the numeral 5 designates the automobile of conventional construction which includes the bumper 6 having the bumper guard 7 secured thereto by means of the bolt 8.

The bolt 8 also serves to secure a bracket 9 to the bumper, said bracket having a tubular housing 10 welded or otherwise secured thereto, the parts thus described being of conductive material.

Fixedly secured in one end of the housing 10 is a metallic plug 11 having an opening 12 formed therein and through which the metallic feeler arm 13 is inserted, the walls of the arm being spaced from the walls of the opening 12 as shown to advantage in Figure 5 of the drawings. The inner end of the arm is anchored in an insulation block 14 fixedly secured in the housing 10 at its end opposite from the plug 11. A circuit wire 15 is secured in contact with the inner end of the arm 13 by means of a plug 16 suitably secured to the end of the block 14.

The arm 13 is maintained in spaced relation from the walls of the opening 12 by means of a felt cap 17 secured on the end of the housing 10, which also protects the same from dirt and moisture. The outer end of the arm 13 is formed with a contact knob 18.

As shown in Figure 10 of the drawings the circuit wire 15 is connected in the electric circuit of the automobile with the battery 19 and a set of signal lamps 20 and 21 adapted to be energized when the arm 13 is moved from the full line position as shown in Figure 5 of the drawings, to the dotted line position whereby the arm will engage the metallic plug 11 and ground the circuit.

Any desired number of the feelers may be attached to different parts of the vehicle and provided with circuit connection with individual signal lamps of contrasting color to indicate which signal switch is being closed upon contact with the object, such as the curbstone as shown at 22 in Figure 1 of the drawings.

It will be understood that the metallic feeler arm 13 is constructed of suitable spring material to enable the necessary flexing thereof upon engagement with an obstruction and also to prevent breaking of the arm.

For this purpose the feeler arm may be constructed of inner and outer sections 23 and 24 as shown in Figure 6 of the drawings, the adjacent ends of the sections being connected by a coil spring 25.

In Figures 8 and 9 I have illustrated a modified form of switch mechanism for the feeler arm, in which the tubular housing is designated at 26, having the plugs 27 and 28 fixedly secured in the opposite ends thereof. Also fixedly secured in the housing is an insulation disk 29 to which the circuit wire 30 is attached by means of a terminal 31, the wire extending outwardly through the plug 28. Slidably mounted in the disk 29 is a stem 32 having a contact head 33 on one end thereof and yieldably urged into engagement with the terminal 31 by means of an expansible coil spring 34 abutting the plug 28.

The contact head 33 is normally maintained out of engagement with the terminal 31 by means of a plunger 35 with one side of which the stem 32 is engageable and having an expansible coiled spring 36 positioned at the opposite side of the plunger 35 in abutting relation with the plug 27. The spring 36 is stronger than the spring 34 and normally the former will compress the spring 34 with the contact 33 out of engagement in the manner as shown in Figure 8 of the drawings.

Extending through the plug 27 and the plunger 35 is a flexible cable 37, the inner end of the cable being anchored by solder or the like, 37', to the side of the plunger 35 which is engaged by the stem 32, and the outer end of the cable is welded or otherwise secured in a bore 38 of a disk 39 which is positioned outwardly against the plug 27, the disk 39 being free from the plug as well as free from the casing. Also welded or otherwise secured in the bore 38 is the feeler arm 40 which projects outwardly therefrom.

In the operation of this switch construction upon the flexing action of the feeler arm 40 by contact with an obstruction, the disk 39 will be tilted in one direction, thereby causing an outward pulling action on the cable 37 against the tension of the spring 36 and permitting the spring 34 to move the plunger 35 toward the left as shown in Figure 8 of the drawings so as to close the circuit connection between the contact 33 and the terminal 31.

In Figures 3 and 4 of the drawings I have illustrated the manner of attaching the feeler arm in different positions to the bumper 6, Figure 3 illustrating the use of a bracket 41 which projects downwardly from the bumper for supporting the tubular switch housing 42 in an upwardly inclined position so that the feeler arm 43 will also project upwardly and forwardly in advance of the bumper for engagement by an obstruction 44 immediately in advance of the vehicle.

In Figure 4 of the drawings a similar forwardly projecting feeler arm 45 is illustrated which is bent intermediate its ends as shown at 46 for connection with the switch housing 47 which is supported in a horizontal position on the bracket 48.

It will be understood that the feeler arm may be secured in position to any desired part of the vehicle so as to indicate when the vehicle approaches too closely an obstruction either on the side, front or at the rear thereof.

It is believed the details of construction, advantages and manner of use of the device will be readily understood from the foregoing without further detailed explanation.

What I claim is:

1. A switch for vehicle parking signals comprising a casing, a movable contact having one end fixed in the casing and a free end projecting from the casing and spaced from the walls thereof, a stationary contact surrounding the movable contact and adapted for engagement therewith upon a predetermined movement of the movable contact and a flexible member covering an end of the casing and having an opening receiving the movable contact for normally maintaining the movable contact spaced from the stationary contact.

2. A switch for vehicle parking signals comprising a casing having a stationary contact therein, a spring actuated reciprocating contact, a spring actuated member normally overcoming the first named spring for maintaining the contacts open, an arm, a coupling connected to one end of the arm and free of the casing and a member having one end connected to the coupling and its other end connected to said spring actuated member to release the spring actuated member upon a predetermined movement of the arm.

3. A switch for vehicle parking signals comprising a casing having a stationary contact therein, a spring actuated reciprocating contact, a spring actuated member normally overcoming the first named spring for maintaining the contacts open, an arm, a coupling outwardly of the casing and attached to one end of the arm and a flexible member connecting the coupling to the spring actuated member, said coupling bearing against the casing as a fulcrum upon a lateral movement of the free end of the arm to exert a pulling force on the spring actuated member for releasing the second contact for closing movement.

4. A switch for vehicle parking signals comprising a casing, a movable contact positioned in the casing, a feeler connected to the movable contact and forming an actuating means for the contact, a stationary contact in the casing and adapted for engagement by the movable contact upon a predetermined lateral movement of the feeler, said contacts being normally disengaged, and a combined cap and support on the casing for the feeler and responsive to movement of the feeler to close the contacts.

WILLIAM P. YARNALL.